United States Patent
Lima et al.

(10) Patent No.: US 10,797,458 B2
(45) Date of Patent: Oct. 6, 2020

(54) METHOD FOR PRODUCING A PLUG

(71) Applicant: CPT Group GmbH, Hannover (DE)

(72) Inventors: Gabriel Simara Lima, Hofheim am Taunus (DE); Otto Korst, Seck (DE); Ralf Muehlhausen, Rotenburg (DE)

(73) Assignee: Vitesco Technologies GmbH, Hannover (DE)

(*) Notice: Subject to any disclaimer, the term of this patent is extended or adjusted under 35 U.S.C. 154(b) by 0 days.

(21) Appl. No.: 16/346,447

(22) PCT Filed: Oct. 26, 2017

(86) PCT No.: PCT/EP2017/077380
§ 371 (c)(1),
(2) Date: Apr. 30, 2019

(87) PCT Pub. No.: WO2018/082992
PCT Pub. Date: May 11, 2018

(65) Prior Publication Data
US 2019/0280446 A1    Sep. 12, 2019

(30) Foreign Application Priority Data
Nov. 2, 2016 (DE) .................. 10 2016 221 460

(51) Int. Cl.
*H01R 43/24* (2006.01)
*F02M 37/10* (2006.01)
(Continued)

(52) U.S. Cl.
CPC ............. *H01R 43/24* (2013.01); *F02M 37/10* (2013.01); *B29C 45/14073* (2013.01); *H01R 13/533* (2013.01); *H01R 13/665* (2013.01)

(58) Field of Classification Search
CPC ........ F02M 37/08; F02M 37/10; F04B 17/04; F04B 35/04; H01R 13/5216;
(Continued)

(56) References Cited
U.S. PATENT DOCUMENTS 5,013,222 A * 5/1991 Sokol .................. F02M 37/08
                                                         123/497
5,141,410 A * 8/1992 Fujii .................. F02M 37/08
                                                         417/423.7
(Continued)

FOREIGN PATENT DOCUMENTS

CN   100 580 242    8/2005
DE   199 21 539     11/2000
(Continued)

OTHER PUBLICATIONS

International Search Report issued in corresponding Application No. PCT/EP2017/077380.
(Continued)

*Primary Examiner* — Carl J Arbes
(74) *Attorney, Agent, or Firm* — Cozen O'Connor

(57) ABSTRACT

A method is provided for producing a plug, having a plastic injection-molded encapsulation, for a fuel pump which arranged in a fuel tank of a motor vehicle. The plug has cables, stranded wires and a ground contact each protruding out of the encapsulation and each connected to encapsulated components. The plug elements and coils are inserted into a base plate. One core of a cable is soldered, welded or crimped to flat plug elements. The coils and stranded wires are each soldered, welded or crimped to a flat plug element. The base plate is inserted into a cavity of an injection mold, such that the cables and the stranded wires protrude out of the cavity through first passage openings and second passage openings, respectively, and cores are arranged in continuous (Continued)

openings of identical cross section in the wall of the injection mold. The cavity is then filled with a plastic.

9 Claims, 3 Drawing Sheets

(51) Int. Cl.
  *B29C 45/14* (2006.01)
  *H01R 13/533* (2006.01)
  *H01R 13/66* (2006.01)

(58) Field of Classification Search
  CPC .... H01R 13/533; H01R 13/665; H01R 43/24; H02K 5/00; B29C 45/14073
  See application file for complete search history.

(56) References Cited

U.S. PATENT DOCUMENTS

| | | | |
|---|---|---|---|
| 5,182,032 A | 1/1993 | Dickie | |
| 5,669,763 A * | 9/1997 | Pryce | H01R 13/5202 417/313 |
| 5,823,797 A | 10/1998 | Sugiyama | |
| 6,478,613 B1 * | 11/2002 | Zoell | H01R 13/533 417/410.1 |
| 6,503,436 B1 | 1/2003 | Koguchi | |
| 6,966,800 B2 * | 11/2005 | Mott | B29C 45/14311 439/722 |
| 7,579,727 B2 * | 8/2009 | Becker | F02M 37/08 310/71 |
| 7,878,851 B2 * | 2/2011 | Silva | F04D 5/002 439/589 |
| 8,102,094 B2 * | 1/2012 | Muehlhausen | H01R 39/36 310/249 |
| 8,202,069 B2 * | 6/2012 | Takagi | F04B 17/03 417/410.1 |
| 8,651,832 B2 * | 2/2014 | Ito | F02M 37/08 417/410.1 |
| 10,193,423 B2 * | 1/2019 | Weber | H02K 3/44 |

FOREIGN PATENT DOCUMENTS

| | | |
|---|---|---|
| DE | 103 26 255 | 1/2005 |
| EP | 1 152 143 | 11/2001 |

OTHER PUBLICATIONS

Written Opinion issued in corresponding Application No. PCT/EP2017/077380.
German Office Action dated Sep. 4, 2017 issued in corresponding German Application No. 10 2016 221 460.8.

* cited by examiner

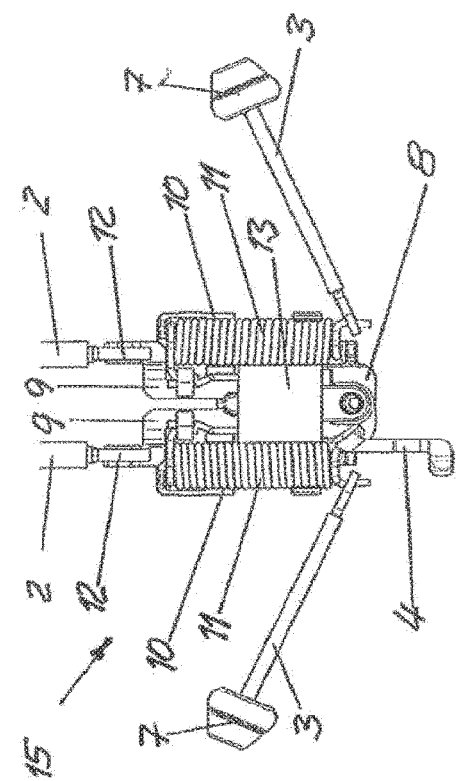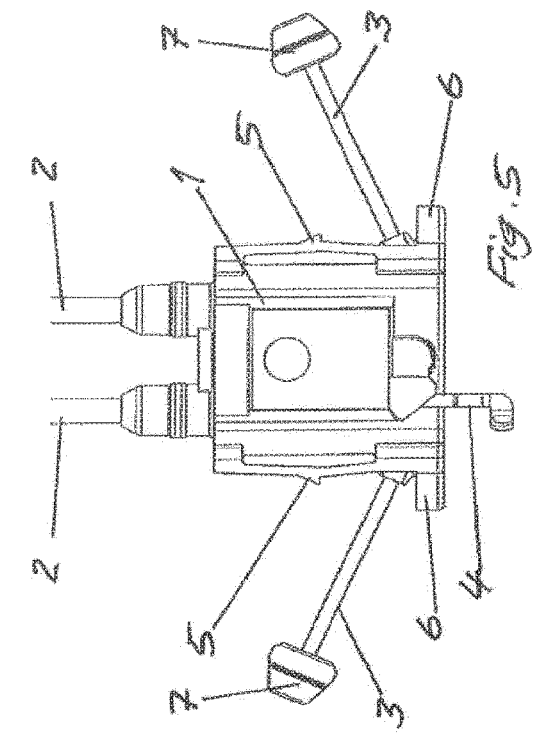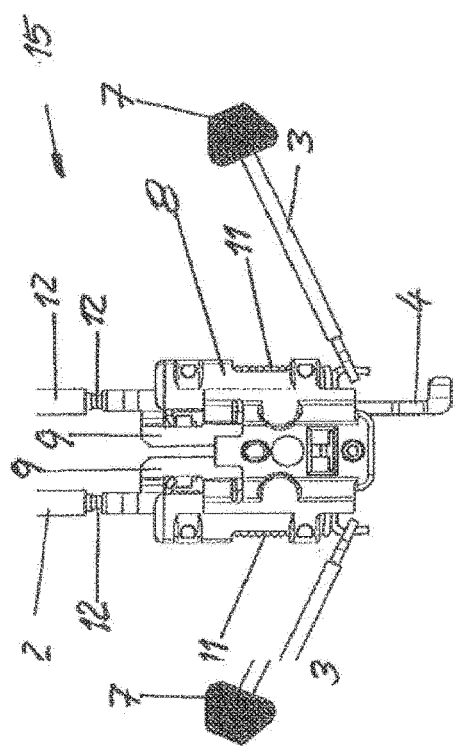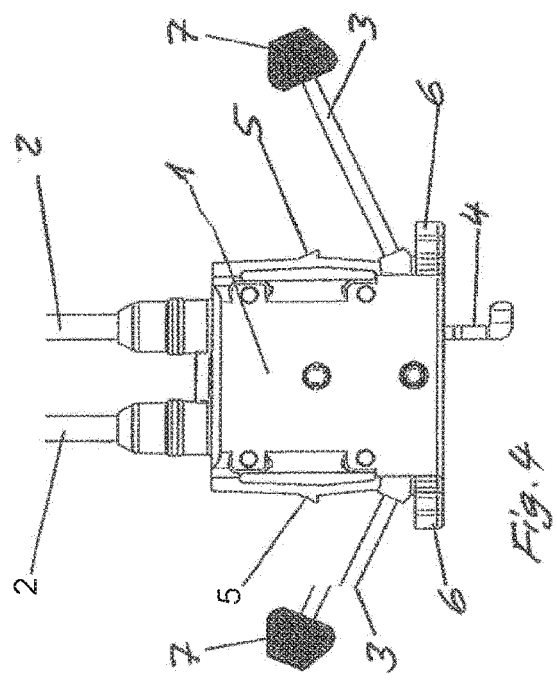

METHOD FOR PRODUCING A PLUG

CROSS REFERENCE TO RELATED APPLICATIONS

This is a U.S. national stage of International application No. PCT/EP2017/077380, filed on Oct. 26, 2017, which claims priority to German Application No. 10 2016 221 460.8, filed Nov. 2, 2016, the content of each of which is incorporated herein by reference.

BACKGROUND OF THE INVENTION

1. Field of the Invention

The invention relates to a method for producing a plug, which is provided with a plastic injection-molded encapsulation, for a fuel pump which is to be arranged in a fuel tank of a motor vehicle.

2. Description of the Prior Art

In known plugs of this kind, which are submerged into the fuel in the fuel tank, the electrical components may move in the cavity of the injection mold such that they come into contact with the wall of the cavity during the injection-molding encapsulation process. This can lead to a leakage from the outside to one or more of the electrical components. This is problematic particularly when the fuel container is filled with an aggressive fuel, such as methanol- or ethanol-containing fuel, which can lead to damage to the electrical components and/or to the connections of the electrical components. In order to avoid this, the plastic injection-molded encapsulation could be designed with thicker walls, but this would lead to an increased weight and to a larger physical size.

SUMMARY OF THE INVENTION

An object of the invention is to provide a method for producing a plug, which is provided with a plastic injection-molded encapsulation, for a fuel pump to be arranged in a fuel tank of a motor vehicle, which method can be carried out in a simple manner, increases the security against leakage of the fuel to the electrical components and allows a low weight and also a smaller physical size.

According to an aspect of the invention, this object may be achieved in that two flat plug elements and two coils are inserted into a base plate, in that in each case one core of a cable is soldered or welded or crimped to the first ends of the flat plug elements, in that one set of ends of the coils are in each case soldered or welded or crimped to a flat plug element, in that one set of ends of two stranded wires are in each case soldered or welded or crimped to a flat plug element or to a coil end, in that the base plate, with the components arranged on it, is inserted into a cavity of an injection mold onto one or more cores, which protrude into the interior of the cavity, horizontally at a distance from the walls of the cavity, wherein the cables protrude out of the cavity through first passage openings and the stranded wires protrude out of the cavity through second passage openings of the wall of the injection mold and the cores are arranged in a movable manner in continuous openings of the same cross section in the wall of the injection mold, and in that the cavity of the now-closed injection mold is then filled with a plastic, wherein the cores are pushed out of the cavity into the or along the openings during the process of filling the cavity with the plastic.

By virtue of this technique, the base plate, which is composed of an electrically insulating material, with the electrical components is securely held at a distance from the wall of the cavity during the injection-molding encapsulation process, so that plastic can reliably flow between the wall of the cavity and the base plate. Shortly before the liquid plastic in the cavity solidifies, the cores are moved, for example in a process-controlled manner, into the, or along the, openings of the wall of the injection mold by the injection-molding machine, so that filling of the cavity with plastic also takes place at the locations of the cores.

The premounting of the electrical components on the base plate and only subsequent arrangement of this unit in the cavity of the injection mold simplifies assembly and can take place in a mechanically streamlined and even manner.

Since the electrical components are fixed on the base plate, they cannot be moved when the plastic is injected into wall regions of the cavity and produce leakage regions of the plug that lead to the electrical components and the connecting points of said electrical components. This also allows the plug to be produced with a small physical size and a low weight.

In order to affix the electrical components on the printed circuit board, the base plate preferably has positioning contours into which the flat plug elements are inserted.

Furthermore, the base plate can have receiving recesses into which the coils are inserted.

The plug can furthermore have further electrical components arranged on the base plate before the base plate is inserted into the cavity.

A further electrical component of this kind can be a ground contact that protrudes out of the cavity through a third passage opening of the cavity.

In order to simplify assembly and in order to reduce the number of components, the ground contact can be formed in one piece with one of the flat plug elements.

A further electrical component can be a capacitor which, due to being premounted on the base plate, is likewise encapsulated by injection molding with plastic with a high degree of reliability.

A low physical size is produced when the two coils are positioned on the base plate at a distance and parallel in relation to one another and the flat plug elements are positioned between the coils parallel in relation to the coils.

Carbon brushes are preferably arranged at those ends of the stranded wires that protrude out of the injection mold.

BRIEF DESCRIPTION OF THE DRAWINGS

An exemplary embodiment of the invention is illustrated in the drawings and will be described in more detail below. In the figures:

FIG. 2 shows a rear view of a base plate of the plug according to FIG. 1, which base plate is provided with electrical components and is not yet encapsulated by injection molding with plastic;

FIG. 3 shows a front view of a base plate of the plug according to FIG. 1, which base plate is provided with electrical components and is not yet encapsulated by injection molding with plastic;

FIG. 4 shows a rear view of the plug according to FIG. 1 which is encapsulated by injection molding with plastic;

FIG. 5 shows a front view of the plug according to FIG. 1 which is encapsulated by injection molding with plastic;

DETAILED DESCRIPTION OF THE PRESENTLY PREFERRED EMBODIMENTS

Figure 1:
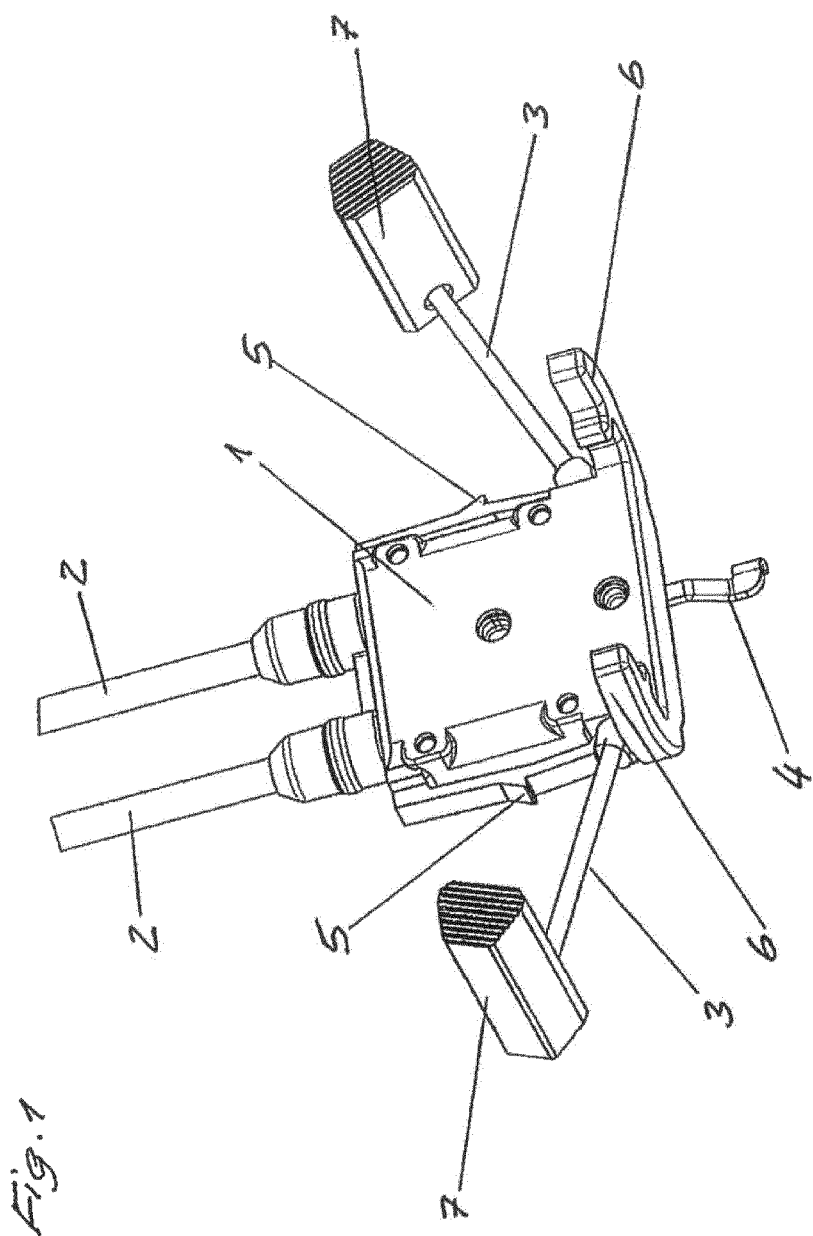
FIG. 1 shows a perspective view of a plug.

FIG. 1 shows the plastic injection-molded encapsulation 1 of a plug, two cables 2, two stranded wires 3 and a ground contact 4 protruding out of the plastic injection-molded encapsulation.

In the region of two sides, in each case one latching hook 5 and, in the bottom region, two holding arms 6, are part of the plastic injection-molded encapsulation 1. The holding arms serve to position carbon brushes 7 for their further use in an end plate assembly, not illustrated.

The carbon brushes 7 are arranged at the free ends of the stranded wires.

In FIG. 2, two flat plug elements 9 have been inserted into positioning contours of a base plate 8. Furthermore, two coils 11 have been inserted into receiving recesses 10 of the base plate.

One of the flat plugs 9 is formed in one piece or integrally with the ground contact 4.

One set of ends of the coils 11 have, in each case, been welded to a flat plug element 9 and the other ends of the coils 11 have, in each case, been welded to one of the stranded wires 3.

Furthermore, as can be seen in FIGS. 2 and 3 in each case one core 12 of two cables 2 has been welded to those ends of the flat plug elements 9 which are averted from the stranded wires 3.

As shown in FIG. 3, a capacitor 13 has been arranged on the base plate 8.

Figure 6:
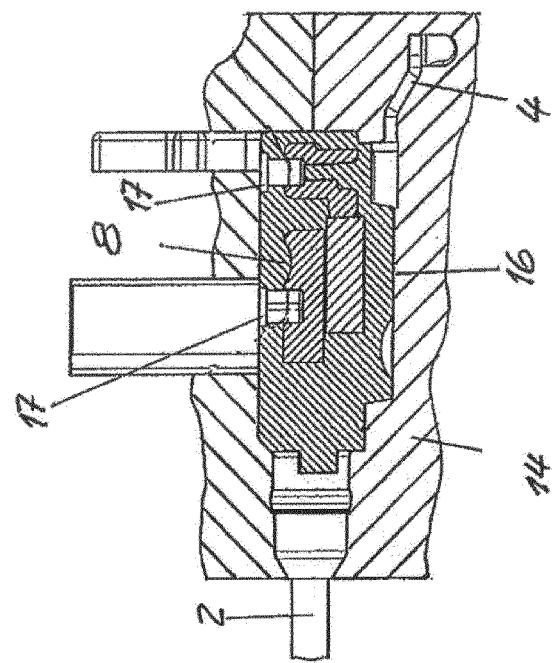
FIG. 6 shows a longitudinal section through the injection mold with the base plate and inserted electrical components according to FIG. 1.
Figure 7:
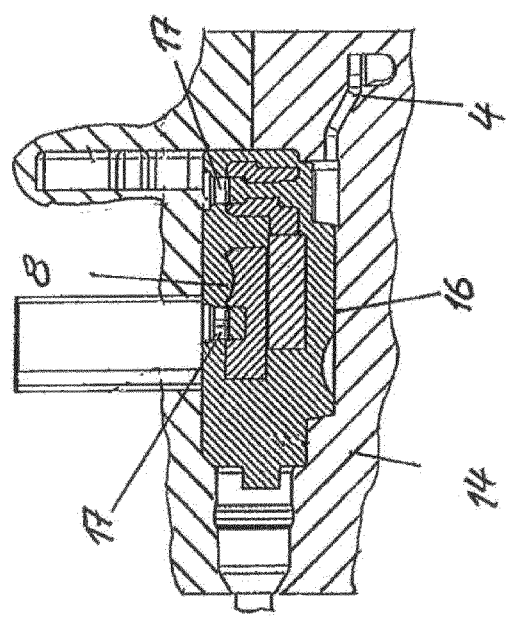
FIG. 7 shows a longitudinal section through the injection mold with the base plate and inserted electrical components according to FIG. 1.

The unit 15 which is preassembled in this way, is then inserted into a cavity 16 of an injection mold 14 and fixed, as shown in FIG. 6. The injection mold 14 has a plurality of openings 17 which lead to the outside from the cavity 16 and in which cores, not illustrated, are arranged in a displaceable manner. In FIG. 6, the cores, not illustrated, protrude into the cavity 16. The unit 15 comprising the base plate 8 is placed onto those free ends of the cores which protrude into the cavity 16 and the injection mold 14 is closed.

In the process, the cables 2, the stranded wires 3 and the ground contact 4 protrude out of the injection mold 14 to the outside via passage openings, not illustrated, in the injection mold 14.

The welding points by way of which the cores 12 are welded to the flat plug elements 9, the further welding points by way of which the coil ends are welded to the flat plug elements 9, and the welding points by way of which the stranded wires are welded to the coil ends are all located within the cavity 16.

Liquid plastic is then injected into the cavity 16. Shortly before the liquid plastic in the cavity 16 solidifies, the cores are retracted, in a process-controlled manner, into the openings 17 by the injection-molding machine. Further plastic mass then enters the resulting clearance in the cavity 16 by the existing injection pressure of the injection-molding machine, the further plastic mass also closing the openings 17 in this way.

Those ends of the cables 2, of the stranded wires 3 and of the ground contact 4 which protrude into the cavity 16 are likewise enclosed by the plastic in a sealing manner.

After the plastic has solidified, the finished plug can be removed from the injection mold 14, the plug being illustrated from the front side and the rear side in FIGS. 4 and 5.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for producing a plug, having a plastic injection-molded encapsulation (1), for a fuel pump arrangeable in a fuel tank of a motor vehicle, the plug having cables (2) and stranded wires (3) and a ground contact (4) each having a first end protruding out of the plastic injection-molding encapsulation (1) and each having a second end connected to electrical components enclosed by the plastic injection-molded encapsulation (1), the method comprising:

inserting two flat plug elements (9) and two coils (11) into a base plate (8);

soldering, or welding, or crimping one core (12) of each cable (2) to first ends of the flat plug elements (9);

soldering, or welding, or crimping one set of ends of each of the coils (11) to one of the flat plug elements (9);

soldering, or welding, or crimping the second end of each of two of the stranded wires (3) to one of the flat plug element (9) or to a coil end;

inserting the base plate (8), with the flat plug elements (9), the coils (11) and the two stranded wires arranged on the base plate (8), into a cavity (16) of an injection mold (14) onto one or more cores, which protrude into the interior of the cavity (16), horizontally at a distance from the walls of the cavity (16), such that the cables (2) protrude out of the cavity (16) through first passage openings and the stranded wires (3) protrude out of the cavity (16) through second passage openings of the injection mold (14);

arranging, in a displaceable manner, the cores in continuous openings (17) of the injection mold (14), each having a same cross section in the wall of the injection mold (14), and closing the cavity (16) of the injection mold (14); then injecting a plastic, in a liquid state, into the cavity (16) to fill the cavity (16) with the plastic; and then retracting, prior to solidification of the liquid plastic in the cavity (16), the cores out of the cavity (16) into the openings (17) to provide a clearance in the cavity (16) so that a further plastic mass enters the clearance in the cavity (16).

2. The method as claimed in claim 1, wherein the base plate (8) has positioning contours into which the flat plug elements (9) are inserted.

3. The method as claimed in claim 2, wherein the base plate (8) has receiving recesses (10) into which the coils (11) are inserted.

4. The method as claimed in claim 2, further comprising arranging further electrical components on the base plate (8) before the base plate (8) is inserted into the cavity (16).

5. The method as claimed in claim 4, wherein the further electrical components include a ground contact (4) that protrudes out of the cavity (16) through a third passage opening of the cavity (16).

6. The method as claimed in claim 5, wherein the ground contact (4) is formed in one piece with one of the flat plug elements (9).

7. The method as claimed in claim 4, wherein the further electrical components include a capacitor (13).

8. The method as claimed in claim 2, wherein the two coils (11) are positioned on the base plate (8) at a distance and parallel in relation to one another and the flat plug elements (9) are positioned between the coils (11) parallel in relation to the coils (11).

9. The method as claimed in claim 2, further comprising arranging carbon brushes (7) at those ends of the stranded wires (3) that protrude out of the injection mold (14).

\* \* \* \* \*